United States Patent
Endle et al.

(10) Patent No.: US 10,913,219 B2
(45) Date of Patent: Feb. 9, 2021

(54) METHOD OF MAKING WEB WITH PARTIALLY EMBEDDED FIBERS

(71) Applicant: 3M INNOVATIVE PROPERTIES COMPANY, St. Paul, MN (US)

(72) Inventors: James P. Endle, New Richmond, WI (US); Michael R. Kesti, Minneapolis, MN (US); Frank T. Sher, St. Paul, MN (US); Dawud H. Tan, Lakeland, MN (US); Patrick J. Yeshe, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 331 days.

(21) Appl. No.: 15/748,345

(22) PCT Filed: Jun. 29, 2016

(86) PCT No.: PCT/US2016/039964
§ 371 (c)(1),
(2) Date: Jan. 29, 2018

(87) PCT Pub. No.: WO2017/019234
PCT Pub. Date: Feb. 2, 2017

(65) Prior Publication Data
US 2018/0215109 A1   Aug. 2, 2018

Related U.S. Application Data

(60) Provisional application No. 62/198,962, filed on Jul. 30, 2015.

(51) Int. Cl.
*B29C 70/50* (2006.01)
*C09J 7/38* (2018.01)
*C09J 7/40* (2018.01)

(52) U.S. Cl.
CPC .......... *B29C 70/506* (2013.01); *B29C 70/504* (2013.01); *C09J 7/38* (2018.01);
(Continued)

(58) Field of Classification Search
CPC . C09J 2201/28; C09J 7/403; C09J 7/38; C09J 2201/32; C09J 2301/206; C09J 2301/204; B29C 70/506; B29C 70/504
See application file for complete search history.

(56) References Cited

U.S. PATENT DOCUMENTS 3,331,729 A   7/1967 Danielso
4,968,562 A   11/1990 Delgado
(Continued)

FOREIGN PATENT DOCUMENTS

EP   0570515   11/1993
EP   0617798   10/1994
(Continued)

OTHER PUBLICATIONS

Satas, et al., Handbook of Pressure Sensitive Adhesives, 2nd Ed. (Von Nostrand Reinhold) N. Y., 1989) pp. 396-456.
(Continued)

*Primary Examiner* — Vishal I Patel
(74) *Attorney, Agent, or Firm* — Vince L. Pham

(57) ABSTRACT

A method of making an adhesive backed web, wherein the adhesive layer of such web has partially embedded filaments projecting therefrom. The filaments may comprise a thermoplastic material or a hot melt adhesive. The filaments are contacted to a major surface of a liner material then pressed partially thereinto. An adhesive layer, as from an adhesive backed film, is then laminated to the filament-containing liner, allowing the adhesive layer to pick up the filaments.

17 Claims, 5 Drawing Sheets

(52) U.S. Cl.
CPC ......... *C09J 7/403* (2018.01); *C09J 2301/204* (2020.08); *C09J 2301/206* (2020.08)

(56) References Cited

U.S. PATENT DOCUMENTS

| | | | |
|---|---|---|---|
| 4,994,322 | A | 2/1991 | Delgado |
| 5,141,790 | A | 8/1992 | Calhoun |
| 5,268,228 | A | 12/1993 | Orr |
| 5,296,277 | A | 3/1994 | Wilson |
| 5,344,681 | A | 9/1994 | Calhoun |
| 5,362,516 | A | 11/1994 | Wilson |
| 5,449,540 | A | 9/1995 | Calhoun |
| 5,585,178 | A | 12/1996 | Calhoun |
| 5,650,215 | A | 7/1997 | Mazurek |
| 5,721,086 | A | 2/1998 | Emslander |
| 5,795,636 | A | 8/1998 | Keller |
| 5,897,930 | A | 4/1999 | Calhoun |
| 6,083,616 | A | 7/2000 | Dressler |
| 6,524,675 | B1 | 2/2003 | Mikami |
| 6,565,697 | B1 | 5/2003 | Maercklein |
| 6,630,049 | B2 | 10/2003 | Hannington |
| 6,872,342 | B2 | 3/2005 | Giachetto |
| 7,344,618 | B2 | 3/2008 | Hannington |
| 8,309,207 | B2 | 11/2012 | Kuiper |
| 2006/0225838 | A1 | 10/2006 | Sher |
| 2008/0299346 | A1 | 12/2008 | Onderisin |
| 2009/0110906 | A1* | 4/2009 | Kleinhoff ................. C09J 7/38 428/313.3 |
| 2011/0111157 | A1 | 5/2011 | Onderisin |
| 2014/0014009 | A1 | 1/2014 | Crockwell |
| 2014/0141214 | A1 | 5/2014 | Steelman |

FOREIGN PATENT DOCUMENTS

| | | | |
|---|---|---|---|
| EP | 1473345 | | 11/2004 |
| EP | 1473345 | A1 * | 11/2004 ............. C09J 7/403 |
| GB | 1511060 | | 5/1978 |
| WO | WO 1996-001687 | | 1/1996 |
| WO | WO 2007-081915 | | 7/2007 |
| WO | WO 2012-078826 | | 6/2012 |
| WO | WO 2014-179660 | | 11/2014 |
| WO | WO 2017-017613 | | 2/2017 |
| WO | WO 2017-019583 | | 2/2017 |

OTHER PUBLICATIONS

International Search report for PCT International application No. PCT/US2016/039964 dated Nov. 21, 2016, 6 pages.

* cited by examiner

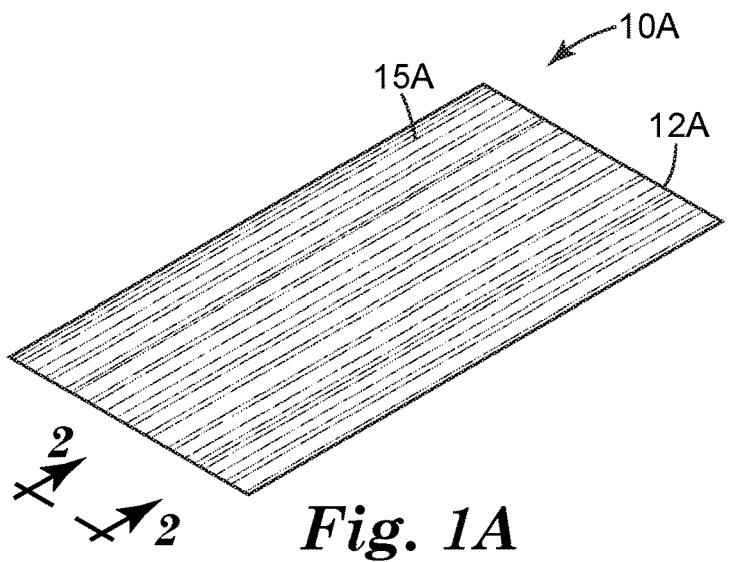
*Fig. 1A*
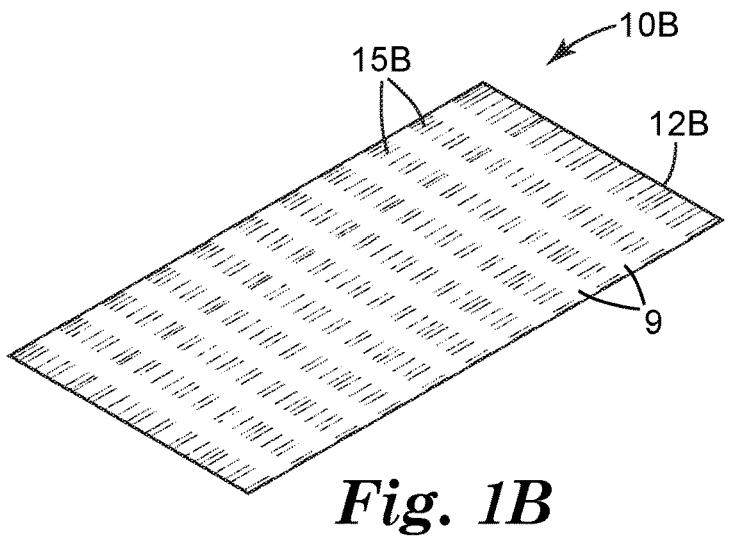
*Fig. 1B*
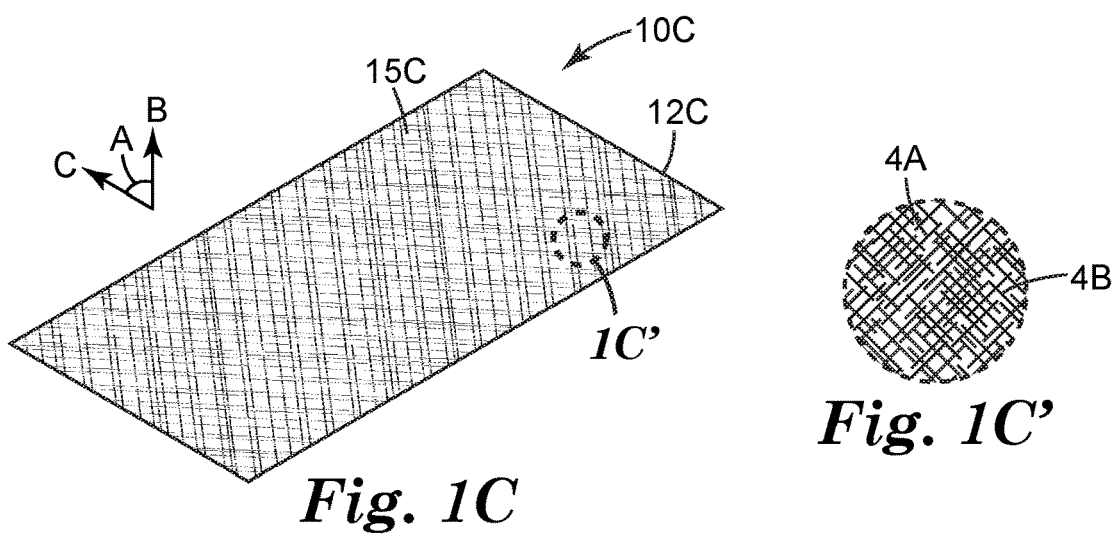
*Fig. 1C*
*Fig. 1C'*

METHOD OF MAKING WEB WITH PARTIALLY EMBEDDED FIBERS

CROSS REFERENCE TO RELATED APPLICATIONS

This application is a national stage filing under 35 U.S.C. 371 of PCT/US2016/039964, filed Jul. 29, 2016, which claims the benefit of U.S. Provisional Application No. 62/198,962, filed Jul. 30, 2015, the disclosure of which is incorporated by reference in its/their entirety herein.

BACKGROUND

Pressure sensitive adhesives are useful for the joining of two materials. The interfaces between the adhesive and the materials are vital to the performance of the joined materials. The loss of adhesion at either interface may result in failure of the materials.

One example of an adhesion interface requiring peak performance is a durable film displaying image graphics adhered to substrates, where the film is a backing material upon which an adhesive layer is added for adhesion to the substrate. Adhesion of a large image graphic film to substrates encounters the problem of entrapped air between the film and the substrate. Anyone who has ever attempted to hang wallpaper can appreciate the frustration that can arise when entrapped air beneath an adhesive-backed film cannot be removed easily. The most common solutions to this problem are to remove and re-apply the film or to perforate the film to release the entrapped air. Multiple attempts to adhere the same film to a substrate can compromise the pressure sensitive adhesive or increase the probability of uneven or misaligned film on the substrate. Perforating a film mars its appearance. The removal of air bubbles is also labor intensive.

Prior approaches have addressed facile adhesion of image graphics film to substrate by concentrating on specialized topographical constructions of the pressure sensitive adhesive, often by coating the adhesive onto a structured release liner and thereby allowing the structure of the release liner to imprint into the adhesive layer. To this end, various technologies have been developed to manufacture such release liners. See, for e.g., U.S. Pat. No. 5,897,930 "Multiple Embossed Webs" (Calhoun, et. al), and U.S. Pat. No. "Adhesive Having a Microreplicated Topography and Methods of Making and Using the Same" (Sher et. al.).

Another approach to topographical adhesives is the formation of ridges or recesses in a release or transfer liner to generate a temporary topography on the adhesive. For example, British Patent Specification 1,511,060 discloses a heat- and pressure sensitive adhesive on an impermeable backing that is formed by application of heat and pressure and a release liner having a specific topography or by coating the adhesive onto the release liner, whereupon the release liner is removed. Then, bonding of the adhesive to the desired substrate also requires a step of heat and pressure that adheres the adhesive layer to the substrate. This step is also required to improve the appearance of the final product. This complicated procedure of generating the adhesion of the layer to the backing and then generating the adhesion to the final substrate minimizes utility of the construction for use in large format graphics and other industrial requirements. Furthermore, the depth of the recesses used to create an effective temporary topography on the nontacky adhesive surface is at least 45 µm, and then only if the width of the recesses is at least 130 µm.

Another example of a temporary topography formed on an adhesive surface is disclosed in U.S. Pat. Nos. 5,344,681 and 5,449,540 (both Calhoun et al.). A segmented pressure-sensitive adhesive transfer tape is designed to prevent lateral flow of the adhesive prior to transfer but allows flow after transfer to form a continuous adhesive bond. The small adhesive segments have controllable thickness. An adhesive transfer tape comprises: a carrier with two opposed surfaces with one containing a series of recesses and the other being relatively smooth; a pressure sensitive adhesive being present in the recesses which are surrounded by an adhesive free area such that when the tape is wound about itself with the surfaces contacting and then unwound, adhesive transfers from the one surface to the other. Preferably, the recesses are formed by embossing and are in spaced-apart relationship. Preferably, they are oval, circular, polygonal or rectangular in cross section. Preferably, the adhesive is acrylic or rubber resin, pressure sensitive.

Another example of a temporary topography formed on an adhesive surface is disclosed in U.S. Pat. No. 5,268,228 (Orr). A double-sided adhesive-coated tape has fine grooves on one or both sides of the tape to facilitate air venting to minimize non-contact areas. The grooves in the tape are fine enough that, once the two surfaces to be bonded are in position, the grooves largely or completely disappear. Example 1 describes scribing lines through a protective sheet that placed grooves 70-150 µm deep in the underlying adhesive surface.).

Good pressure sensitive adhesives for image graphics are available on image graphic films by 3M of St. Paul, Minn., USA. Pressure sensitive adhesives having this utility are disclosed in a variety of patents. Representative examples of patents describing such materials include U.S. Pat. Nos. 5,296,277 and 5,362,516 (both Wilson et al.) and U.S. Pat. No. 5,141,790 (Calhoun et al.). These patents disclose how the adhesive's topography is built from the interface between the adhesive and the release liner. The principal topographical features in the adhesive surface are isolated protrusions from the adhesive surface with identified contact areas.

SUMMARY

The art needs films having air egress, tack control, or both, with less complicated manufacturing techniques. In some of the embodiments described herein, tack control and air egress are provided by a single mechanical feature: filaments, which are partially disposed in the adhesive layer of an adhesive-backed film in such a way that portions of them sit proud from the major adhesive surface, holding the adhesive layer out, away from an installation surface somewhat, thus providing tackiness (until the presence of intentional application pressure, as from a squeegee or other application device). The filaments also introduce channels for air or fluid egress into the adhesive layer.

An installer of graphic film as described herein upon a wall may take advantage of the tack control by positioning and repositioning the graphic film until it is just right, then may use a squeegee, hand, or other pressure device to push the film further onto the application surface, working air or fluid bubbles out to the edges of the film via egress pathways provided by the filaments. In some embodiments, the filaments are hot melt adhesive, such that an installation technique that involves heat may improve the bonding of the graphic film to the substrate.

In some embodiments, such films have simplified manufacturing, because they may eliminate the need for distinct manufacturing techniques related to air egress and tack control features. In some embodiments, as for example where the filaments comprise hot melt adhesive, the resultant bond between the graphic film and the installation surface, after installation in the presence of heat, is improved.

Air egress and repositionability are desirable features for some adhesive backed graphic films, allowing an installer to reposition the graphic on a surface multiple times until the positioning is acceptable, and then allowing the installer to remove air or fluid pockets with the use of a or other application device. Such features may be facilitated through the build-up of such graphic films on a suitable liner, as described herein.

In one embodiment, thermoplastic filaments are pressed into a release liner, such that some of the filaments extend past the major surface of the release liner. The adhesive side of an adhesive backed film contacted to the filament-containing release liner, such that the adhesive layer bonds to and encompassing portions of the filaments extending past the major surface of the release liner. When the release liner is removed, the resultant structure is an adhesive-backed film wherein the adhesive layer includes portions of filaments embedded therein. These filaments, in various embodiments, serve to hold the adhesive layer up, away from an installation surface (facilitating tack control, which assists may translate to repositionability), and also create channels on either side of the filament (facilitating air or fluid egress). Particular embodiments may be generated that are tuned to one of these features or the other.

BRIEF DESCRIPTION OF DRAWINGS

FIG. 1A is a drawing of a liner having partially embedded filaments disposed thereon.

FIG. 1B is a drawing of a liner having partially embedded filaments disposed thereon.

FIG. 1C is a drawing of a liner having partially embedded filaments disposed thereon.

FIG. 1C' is a zoom in on a portion of the liner shown in FIG. 1C.

FIG. 1D' is a zoom in on a portion of the liner shown in FIG. 1D.

FIG. 1E' is a zoom in on a portion of the liner shown in FIG. 1E.

DETAILED DESCRIPTION

Figure 1D:
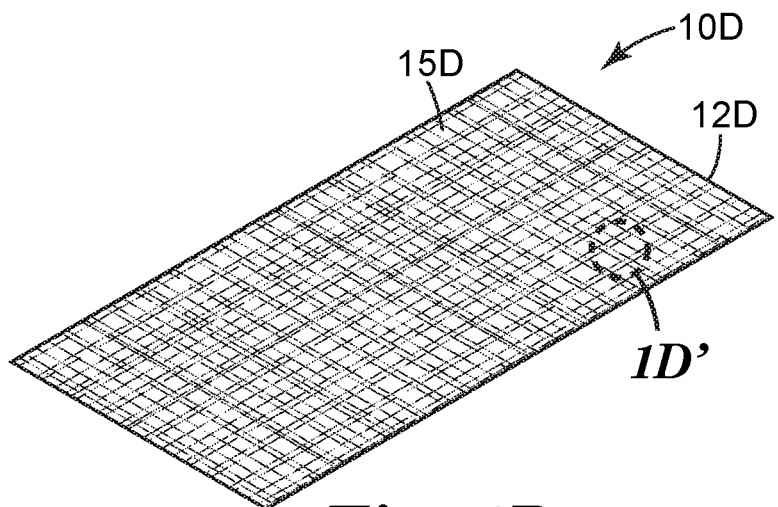
FIG. 1D is a drawing of a liner having partially embedded filaments disposed thereon.
Figure 1D:
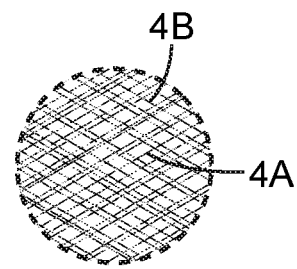

Graphic films, as may often be seen containing commercial advertising content, when installed on installation substrate (such as walls, vehicles, boats, semi-trucks, etc.), are typically installed as follows: A film having an adhesive coating on one major side thereof (with a thin sacrificial liner film to protect the adhesive layer until installation), may first be printed with content of choice, thus producing a graphic film. In the art, this film is may be called a backing. An overlaminate protective layer, or a protective clear coat, may then be applied over the printed side. These steps typically take place at a graphic sign shop. When the graphic film is ready to be installed, the graphic film is taken to the installation site, which may be a wall, floor, or any suitable surface, where the installer removes portions of the liner. Depending on the installation specifics and the size of the graphic film, the installer may remove the whole liner, or merely pull back the liner a certain parts, exposing the adhesive layer. The installer then loosely positions the graphic film upon the substrate, often times iteratively getting the positioning just right, by lifting, positionally adjusting, then re-setting the graphic film against the substrate. When the installer is satisfied with the positioning, while the graphic film is still relatively loosely tacked to the wall, he may use a squeegee or other pressure producing device to press the loosely tacked areas of adhesive-backed graphic film onto the installation surface. Further portions of the liner are then removed, and the graphic film further pressed onto the installation surface. All the while, the installer is careful to minimize air or fluid bubbles (depending on the characteristics of the film to be installed, the surface or adhesive is sprayed with detergent and water, which can aid in the installation process). If bubbles do occur, the installer works them to the edge with his squeegee, or he may lance them with needle or sharp knife.

Graphic films known in the art and suitable for such an installation have been engineered to include features that provide for enhanced fluid egress and tack control. Regarding fluid egress, such features often exist by way of channels formed into the adhesive layer itself, by methodologies known in the art, but often involving embossing a raised pattern into the liner, which serves to structure the adhesive layer, introducing a network of channels by which fluid may egress. With regard to tack control, there are a number of approaches taken in the art, most of which involve the presence of material or mechanical features, e.g. bumps, sometimes made of ceramic material, designed to prevent the adhesive layer from aggressively adhering to the installation substrate except in the presence of intentional pressure as from an installer. For example, an array of small raised non-adhesive pegs disposed on the adhesive layer may provide good tack control.

The problems of air bubble formation and fluid egress problems are well understood in association with large format graphics, but these problems also exist for small graphics, decals, and other adhesive backed articles, where speed of application is important for economic or manufacturing reasons.

A new way to provide for fluid egress and tack control has been discovered. The new method and article involves the provisioning of fluid and air egress, as well as tack control, through the use of long, thin filament pieces embedded in an adhesive layer of an adhesive backed film. This newly discovered approach has the potential to provide benefits in terms of manufacturing costs, while providing good field performance. In one embodiment, this new construction may avoid or minimize manufacturing complexities associated with structuring the adhesive layer using an embossed liner, an approached used in the prior art. In various embodiments, the newly discovered process and article also only requires one mechanical structure (the partially embedded filaments) to provide both fluid egress and tack control.

FIG. 1A is a rendering of a filament-containing release liner 10A including release liner 12A having filaments 15 pressed into the surface thereof. In the embodiment shown, there is not yet an adhesive layer, which will later be applied as a layer, enveloping or partially enveloping the filaments, to the extent that they sit proud of the major surface of release liner 12A.

Release liner 12A is a film intended to be utilized as liner stock in conjunction with protecting the adhesive part of an adhesive backed film. Release liner 12A may be any suitable type of liner material; in some embodiments it may comprise a paper or plastic-based film, which depending on application may be coated with a material (such as a silicone-based material) that prevents an adhesive, as from an adhesive-backed film, from overly aggressively adhering from its surface. Release liners are designed to facilitate manufacturing of an adhesive-backed film, and protect said adhesive backing from the time of manufacture until installation. At installation time, the release liner is typically removed from the adhesive backed film and discarded or recycled. Release liners may comprise many different materials known in the art, including for example, paper, polyester, or HDPE film substrates.

Filaments 15 are long, thin (high aspect ratio) fiber strands, having average cross section dimension of 50 µm or less. In some embodiments they may extend for very long runs, particularly down-web. In other embodiments, the filaments are filament pieces, for example between 10 and 50 mm, though other sized pieces are possible. The filaments are nipped or otherwise pressed into the surface liner 12A, as will be further discussed later in this disclosure. Larger cross sections are possible and contemplated within the scope of this disclosure, but as the filaments become larger, it may be more difficult to hide their appearance on a finished graphic article, depending on the characteristics of the adhesive layer and other substrates. In one embodiment, the filaments 15 comprise thermoplastic extrusions, and in a further embodiment they comprise a thermoplastic resin that may melt at temperatures between about 115° C. and 171° C. (or even as high as 200° C. or higher, or as low as 100° C. or lower). Filaments could be made out of a thermoplastic-thermoset material that cures upon extrusion; they could also be made of UV curable materials.

Liner 12A has a total area "T", a first area "A" that is the area of the "lands" or filaments 15A when viewed from a plan perspective. In some embodiments, there may be hundreds or even thousands or hundreds of thousands of filaments on a liner. The ratio of A to T for non-thermoset adhesive filaments may be from 5-99%, more preferably from 5 to 50%; in our experiments a ratio providing good performance characteristics of egress and controlled tack in a graphic film application, without significant degradation of adhesion, is between about 5% and 15%. If the filaments are heat activated, thermoset adhesive strands, however the A to T ratio can be much higher and still provide adequate adhesion and even improved adhesion when compared with non-heat activated filaments. For example, with heat activated adhesive filaments, the A to T ratio might be 10-50% and provide good air egress and adequate tack control, and even better adhesion after application (as compared with a non-heat activated adhesive filament). Of course, the heat activated adhesive filament embodiments could use much higher A to T ratios as needed, possibly at ratios the way up to 90%, and possible more. A higher A to T ratio will result in lower tack (to some degree this corresponds with improved repositionability), improved air egress, but worse initial adhesion.

Figure 1E:
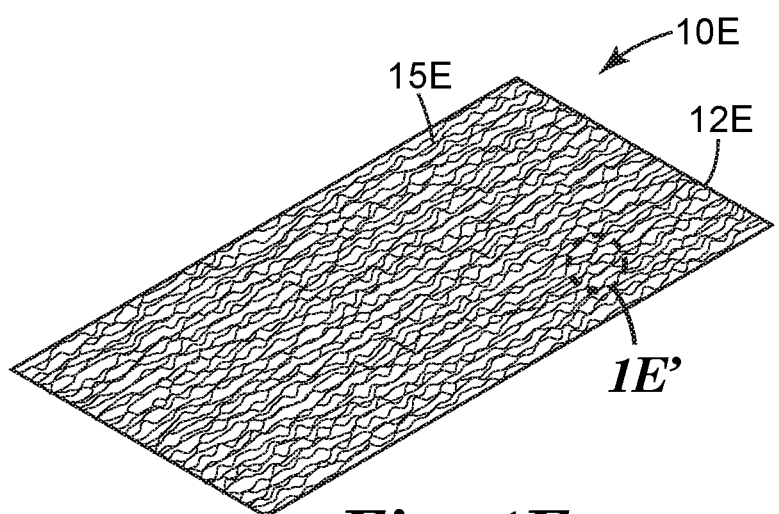
FIG. 1E is a drawing of a liner having partially embedded filaments disposed thereon.
Figure 1E:
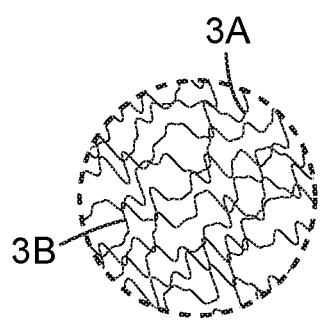
Figure 2:
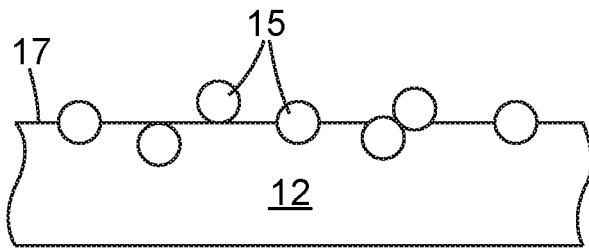
FIG. 2 is a drawing of a liner having partially embedded filaments disposed thereon, in profile view.

All of these values are average values, and exemplary only—certain embodiments of the methods described herein have high variability—for example, the filaments in fact overlap in some places, and the filaments themselves may be broken or not pressed into the surface of liner 12 at some places (hence in reference to FIG. 2, which is an end view of a portion of liner 12A shown in FIG. 1 (and as specified "2" in FIG. 1), filaments 15 are shown extending into surface 17 of liner 12 to various degrees—some are almost fully extended into surface 17; others do not extend in at all). At 300 µm spacing, and 50 µm diameter, the A to T is about 15%. In some embodiments, as mentioned, A to T may be greater than or equal to 15%, but other percentages are suitable for different applications, as will be appreciated upon further review of this disclosure.

As mentioned, filaments 15 may be pressed into release liner 12 per a roll-to-roll manufacturing operation. Most commonly this is done via a nip. Generally, the filaments in are applied in a down-web direction, resulting in a down-web orientation, though in some embodiments a substantial cross-web effect may be introduced by various techniques known in the art (e.g., moving the release liner web or die side-to-side as the filaments are introduced onto the surface of the release liner, or blowing partially oriented fiber pieces at different angles onto the liner). Filaments 15 are generally manufactured by way of extrusion, then drawn to a desired average cross-section before being pressed into the surface of release liner 12, as will be discussed further in this disclosure.

Filaments 15 may be very long and continuous (unbroken) along extended portions of the web, or they may be broken, either intentionally, as will be discussed in conjunction with some embodiments, or as a result of manufacturing process variability. Filaments 15 in one embodiment are uniformly distributed across the web, in one embodiment covering about 15% of the surface area of the web, as mentioned earlier. Filaments 15 may be generally linear, having a dimensionality generally down-web (as is shown in the embodiment associated with FIG. 1A, or they may embody a sinusoidal or zig-zag pattern (see FIG. 1E), or such patterns may be combined. Sinusoidal or zig-zag patterns may be introduced to the web by cross-web oscillation of the web or the installation die. Such patterns may have a period of anywhere from 25 to 50 mm or more (or less) in the down-web direction. FIG. 1E is a rendering of what such a web might look like. Release liner with partially embedded filaments 10E is shown as comprising release liner 12E and a plurality of filaments contacted to a major side thereof. FIG. 1E' is a close up of a portion of the liner, and shows filaments 3A and 3B have a rough sinusoidal pattern, resulting in the filaments overlapping at various points. Such overlap effects cross-web air and fluid egress, as will be seen.

Cross web filaments, oriented orthogonally relative to the down-web filaments (other orientations that are more or less than 90 degrees different area also possible), may also be placed on top of (or on bottom of) the down-web oriented filaments, as will be described further in one of the examples below. FIG. 1D shows a rendering of what such an embodiment would look like. Release liner having partially embedded filaments 10D comprises release liner 12D contacted with a plurality filaments comprising two sets of filaments, oriented generally orthogonally to each other. For example, in FIG. 1D', filament 4B (associated with a down-web direction) is shown as overlapping or underlapping and orthogonally extending across filament 4A, which is associated with a cross-web direction. Filaments 15 in one embodiment comprise thermoplastic extrusions. In one embodiment, the thermoplastic extrusions have a melt index value of 1-500, measured according to ASTM D1238.

Filaments may also be filament pieces or fragments, straight or crimped, available from $3^{rd}$ party manufacturers, such as T262 1.3 Dtex×12 MM uncrimped core-sheath PES/PBT biconponent, available from Trevira GmbH of Hattersheim, Germany.

In addition to thermoplastic extrusion, filaments could be produced by a liquid extrusion process. The liquid could be 100% solids (e.g. a UV curable resin). The liquid could also be a polymer or mix of polymers including thermoplastics or thermosets or a combination thereof in a solvent or mixture of solvents such as water, alcohol, ketones, or any solvent known in the art to dissolve polymers. The liquid could also be an emulsion such as a latex emulsion. The liquid could exit the die and either exit at the desired diameter or be drawn smaller similar to the extruded filaments. Thereafter the solvent can evaporate, or the material can be cured creating a filament useful in this invention.

The cross sectional profile of the filaments 15, as seen in FIG. 2, may be basically round, or they may be any suitable shape. The pressing operation may modify the cross-sectional profile, effectively flattening what would be basically round filaments.

The filaments are pressed into a release liner, preferably as part of a roll-to-roll manufacturing operation. The 12 liner may be a release liner. Liner 12 can be any suitable release or transfer liner known to those skilled in the art for use with adhesives and that is capable of having filaments pressed thereon. Nonlimiting examples of liners include a variety of commercial materials from 3M of St. Paul, Minn., and other commercial manufacturers of liner products such as Rexam Release Corporation of Oakbrook, Ill., Daubert Coated Products of Westchester, Ill., or Loparex of Cary, N.C. Liners are typically polyethylene coated papers with commercial silicone release coatings; polyethylene coated poly (ethylene terephthalate) films with commercial silicone release coatings; or cast polypropylene films which can be embossed with pattern(s) while making such films, and thereafter coated with commercial silicone release coatings. Additional useful liners are identified in the Calhoun et al. and Wilson et al. patents, referenced above.

Generally, the filaments should be harder than the release liner during the pressing, such that the filaments will be at least partially pressed into the surface of the release liner (e.g., the liner material will deform somewhat to accommodate the pressed filaments). The release liner may be heated to a softening point to effect this appropriate variation in hardness. In some embodiments, the filaments are, at typical processing temperatures, already harder than the release liner so may not be necessary to effect further softening of the release liner.

FIG. 2 is an end view of release liner 10, as per view "2" in FIG. 1A (or as per similar views associated with embodiments shown in FIGS. 1B-1E). Filaments 15 are seen to be distributed across surface 17 of liner 12. From left to right, individual filaments may be seen to be partially embedded into release liner 12, with only a portion of the filament extending outward from the major plane of surface 17. Some filaments, at any given cross-section, may be 0%, 10%, 20%, 30%, 40%, 50%, 60%, 70%, 80%, or even 90% or more enveloped within liner 12. The same filament may be enveloped a different percentage at a different cross-section (upweb or downweb). Thus the filaments exhibit variability regarding how much they are embedded within the liner 12, or conversely, how much they protrude from major surface 17 of liner 12. In some preferred embodiments, 80-100% of the filaments, in cross section, extend below the surface 17 of liner 12; thus the other 0 to 20% of the filaments will protrude above (e.g., sit proud of) surface 17. Generally, for filaments having an average cross-sectional width of 15 μm, the filaments will be >3 μm, preferably >5 μm, and even more preferably >10 μm embedded into the liner, on average.

Figure 3:
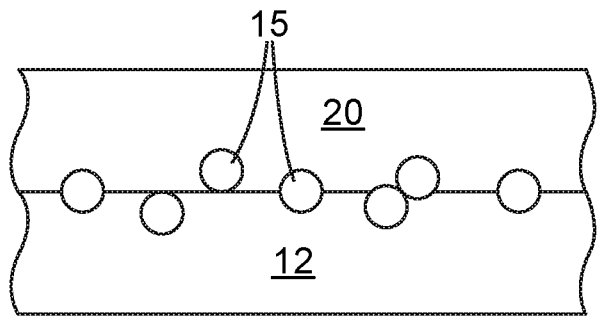
FIG. 3 is a drawing of a liner having partially embedded filaments disposed thereon, and an adhesive layer enveloping or partially enveloping the non-embedded portions of the filaments.

FIG. 3 is the cross sectional rendering of the release liner shown in FIG. 2, additionally including a further adhesive layer 20. After the filaments 15 are pressed into liner 12, an adhesive is disposed onto the filament-containing side of liner 12. The adhesive may be so disposed by techniques known in the art, including liquid coating (and subsequent UV curing), or by lamination wherein an adhesive or an adhesive backed liner is pressed onto the filament-containing side of the liner 12 as both materials pass through a nip. Other ways of disposing an adhesive layer onto the filament-containing side of liner 12 will be apparent to those skilled in the art. The adhesive may be any suitable pressure sensitive adhesive. Nonlimiting examples of pressure sensitive adhesives include those disclosed in U.S. Pat. No. 4,994.322 (Delgado et al.); U.S. Pat. No. 4,968,562 (Delgado); EPO Publication 0 570 515; EPO Publication 0 617 798; pressure sensitive adhesives disclosed in U.S. Pat. Nos. 5,296,277 and 5,362,516 (both Wilson et al.) and U.S. Pat. No. 5,141,790 (Calhoun et al.) and PCT Patent Application Serial No. WO US96/1687 (Keller at al.), and any other type of pressure sensitive adhesive disclosed in Satas, et al., Handbook of Pressure Sensitive Adhesives, 2nd Ed. (Von Nostrand Reinhold) N.Y., 1989).

Suitable choices may include tackified rubbers, acrylates, methacrylates, etc. Manufacturing process variability may jostle the filaments and liner somewhat before adhesive is applied, causing some portions of a given filament, when viewed in cross section, to be positioned fully proud of the surface of liner 12, and thus fully encompassed within the adhesive layer 20. Of course, other filaments remain partially embedded within liner 12, and thereby have portions that are not exposed to adhesive layer 20. As mentioned in reference to FIG. 2, filaments are preferably partially embedded in the liner, such that the adhesive coating may envelop only the portion of the filament not embedded in the liner. In practice, if filaments on average have a diameter (or height) of 15 μm, the filaments may extend on average about 80-100%, or 12-15 μm into the surface of liner 12, allowing the remaining portion of the filament (0-20%, or about 0-3 μm) to protrude from surface 17 and thereby be encompassed by adhesive layer 20. As mentioned, given the sheer volume of filaments and process variability, the actual depth to which the filaments may be embedded will vary, with some filaments not being at all embedded, and others being almost fully embedded.

In one embodiment, filaments have a cross section or diameter that is smaller than the thickness of the adhesive layer 20, such that even filaments that sit fully proud of surface 17 may be fully encompassed by adhesive layer 20. Returning briefly to FIG. 1 and the percentage of A to T—it may now be appreciated that once the liner 12 is removed from adhesive layer 20, the filaments 15 will stick to adhesive layer 20 and thereby create a series of filaments on the surface of adhesive layer 20. Most of the filaments, in one embodiment, will have diameters that extend 80% or more, in cross section, above the surface of adhesive layer 20. When the non-filament containing side of adhesive layer 20 interfaces with a graphic layer (e.g., a printed graphic to be installed on a surface), as is one example of a contemplated application of the construction thus described, these filaments serve at least two purposes during the installation of said graphic layer on a surface: (1) they hold the adhesive layer away from the surface somewhat, promoting repositionability of the graphic layer on an application surface; and (2) fluid egress (e.g., driving air or liquid bubbles to the sides of such graphic layer, with a hand or squeegee, so they might escape from under the graphic layer. If the thermoplastic extrusions comprise a hot-melt adhesive, once the graphic has been properly positioned with bubbles removed, the graphic hot-melt adhesive may be activated, for example by using a heat gun or torch or other heating device, thus promoting improved adhesion and also flattening the filaments. As mentioned in reference to FIG. 1, one A to T ratio of about 15% has been seen to work satisfactorily for air egress and repositionability when using 15 μm average diameter filaments (which extend 80-100%, e.g., 12-15 μm, into the surface of liner 12). However, a higher A to T ratio will result in better repositionability and egress, at the expense of adhesion from the pressure sensitive adhesive. If the filaments comprise hot melt adhesive, i.e., the ultimate adhesive qualities are to be enhanced by a final heating step anyway, the performance of the pressure sensitive adhesive may not be as critical. However, a lower A to T may be desirable when the filaments do not comprise a hot melt adhesive, and the pressure sensitive adhesive is to be relied on as the primary adhesive mechanism. The A to T ratio can be higher than 15% and still provide good repositionability and air egress (while improving adhesion)—ratios of 20%, 25%, 30%, 35%, 40%, 45%, 50%, 55%, 60%, 65%, 70%, 75%, 80%, and even higher may be suitable for some applications, with the higher levels more particularly suited to embodiments where the filaments comprise hot melt adhesives which are activated by introducing heat, as from a heat gun, during the installation process. Conversely, ratios less than 15%, including 10% or even 5% may be desirable for some applications.

Adhesives can be selected from a variety of conventional adhesive formulations. Nonlimiting examples of adhesives include pressure sensitive adhesives, hot melt or heat activated adhesives that are pressure sensitive at the time of application such as pressure sensitive adhesives disclosed in U.S. Pat. No. 4,994,322 (Delgado et al.); U.S. Pat. No. 4,968,562 (Delgado); EPO Publication 0 570 515; EPO Publication 0 617 708; pressure sensitive adhesives disclosed in U.S. Pat. Nos. 5,296,277 and 5,362,516 (both Wilson et al.) and U.S. Pat. No. 5,141,790 (Calhoun et al.) and U.S. patent application Ser. No. 08/559,037 (Keller et al.), all incorporated by reference and any other type of pressure sensitive adhesive disclosed in Satas, et al., Handbook of Pressure Sensitive Adhesives, 2nd Ed. (Von Nostrand Reinhold, N.Y., 1989), the disclosure of which is incorporated by reference.

Figure 4:
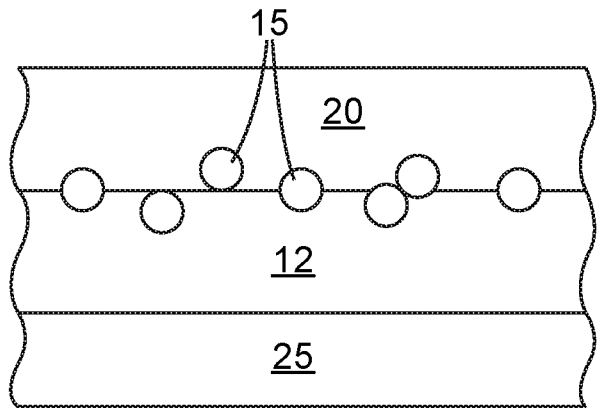
FIG. 4 is a drawing of a liner stack.

FIG. 4 is the cross sectional rendering of the release liner shown in FIG. 3, but additionally including paper backing 25. In such a construction, paper backing 25 would support a polyethylene film (liner 12), the top side of which (that is, the side interfacing with adhesive layer 20) would be coated with a release agent of some sort (often silicone-based). While liner 12 and paper backing 25 are shown separate in FIG. 4, in practice a reference to "release liner" may comprise the paper backing (if present), the polyethylene liner layer 12, and the release agent (if present).

Figure 5:
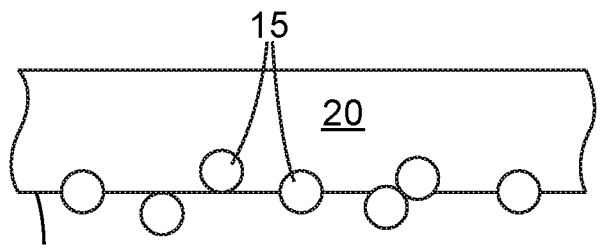
FIG. 5 is a drawing of an adhesive layer having partially embedded filaments.

FIG. 5 is a cross sectional rendering of the adhesive layer and filaments shown in earlier figures, but now with liner 12 removed. The filaments 15 extending into the surface of liner 12 were protected from adhesive layer 20, and now, to the extent they were enveloped in liner 12, they sit proud of major adhesive surface plane 19. Such portions of such filaments do not contain adhesive.

Figure 6:
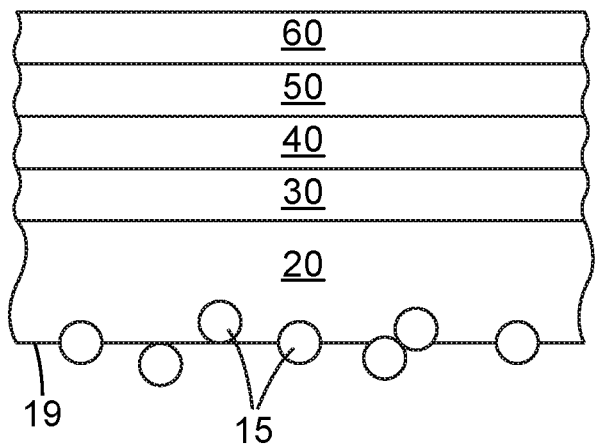
FIG. 6 is a drawing of a film stack on top of an adhesive layer having partially embedded filaments.

FIG. 6 is a cross-sectional rendering of the adhesive layer and filaments, with liner removed (as in FIG. 5), but additionally including a number of further layers as might typically be seen in a field application of a graphic. Adhesive layer 20 is coupled to film 30. Film 30 may be any suitable film, such as PVC-based films, or polyolefin films, or thermoplastic polyurethane and cellulose ester films as described in US Patent Application Publication Nos. 2014/0141214 "Graphic Article" (Steelman and Lyon) and 2014/014009 "Graphic Article" (also Steelman and Lyon). Film 30 may also comprise films useful for contact with adhesive surfaces including Controltac™ branded films commercially available from 3M, films disclosed in U.S. Pat. No. 5,721,086, foils, metallic plates, ceramic plates, polymeric sheets, vibration damping materials, reflective sheeting, retroreflective sheeting, top-coated materials, industrial tape backings, hypoallergenic tape backings, and combinations thereof.

The upper surface of film 30 may be printed with text, images, graphics, advertising, etc. In some embodiments, a liner (e.g., liner 12 from earlier described embodiments), along with the filaments and adhesive layer and the film layer 30, are sold by sheet or roll for printing or other use, and further layers, such as further adhesive layer 40, overlaminate 50, and clear coat layer 60 are (optionally) added layer.

Any suitable film can comprise film 30, which is contacted to the major surface of adhesive opposite the major surface(s) of adhesive having filaments extending from the surface thereof. Because the film is laminated to adhesive after the adhesive is applied to the filament-containing liner, the appearance of any exposed major surface of film 30 is not generally adversely affected by the topography of the filaments. With that advantage, film 30 can be imaged using any commercial technique, including electrography, inkjet, screen printing, flexography, electronic cutting, or other imaging or graphic techniques.

Figure 7:
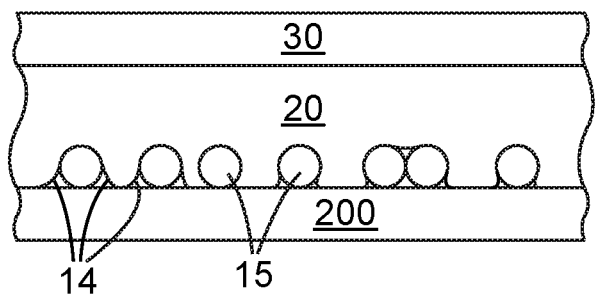
FIG. 7 is a drawing of an adhesive-backed film as pressed against an installation surface, with filaments partially embedded in the adhesive layer creating air or fluid pathways on the sides of some of the filaments.

FIG. 7 is a cross-sectional rendering applied film article 51, which comprises film 30 applied to substrate 200. Substrate 200 may be, for example, a wall in a commercial establishment, and the upper major surface of film 30 may be printed with graphics. An application technician may remove liner 12 (as in FIGS. 2, 3, 4), exposing filament containing adhesive layer 20. The technician may then gently bring the adhesive-and-filament exposed film (e.g., the stack that comprises filaments 15, adhesive layer, and film 30 (and any further films or layers as exemplified in the embodiment shown in FIG. 6)) into contact with the application surface of the wall. The filaments hold the adhesive layer away from the application surface of substrate 200, promoting repositionability, that is, the ability of the technician to tack up the graphic film and then remove it to change its position. When the graphic is properly positioned, the technician may more firmly press the filament containing adhesive layer 20 into the substrate, promoting more intimate contact between the adhesive layer 20 and the surface of substrate 200. Air or fluid egress channels, or conduits, 14 are formed in areas adjacent to filaments 15. The technician, with aid of a squeegee or similar device, may then push any developed air pockets (or fluid pockets if a water or solvent mixture is used in the application process) for egress at the periphery of the film article. Such fluid egress is facilitated by the filament channels that may exist on either side of filament 15.

After application, if the filaments comprise hot melt adhesive or heat activated material, the technician may use a heat gun or other heat source to heat up the filaments and then use a roller or other application device to further press film onto the surface of substrate 200. In the process, the filaments are flattened and/or the adhesion is activated so as to promote further adhesion.

In many film article applications that involve printed graphics, linear, generally down-web, air egress is acceptable. In some cases, however, it may be preferred to have cross-web air egress also. Cross-web egress can be achieved in a number of ways. In one example, a zig-zag or sinusoidal pattern may be introduced to the down-web filaments, providing cross-web pathways (as seen in FIG. 1E). In another embodiment, cross-web sections of the filaments can be laser ablated and/or melted. For example, a 0.25 to 5 mm section of the filaments, across the whole web, could be ablated at a pitch of 12 mm or more. In one embodiment, ablation removes a 5 mm gap at a 12 mm pitch. FIG. 1B shows a rendering of what such an embodiment would look like. Release liner having partially embedded filaments 10B comprises release liner 12B contacted with partially embedded filaments 15B. The filaments have a directionality associated with the down-web direction of the web. Areas between the filaments have been ablated at a regular pitch, creating the look of cross-web stripes, alternating between sections of filament-containing material and sections devoid of filament containing material. These cross-web sections promote cross-web air egress in a finished article.

In another example, the filaments can be embossed in a periodic manner. The embossing will preferably reduce the height of the filament by 50-90% to allow fluid to egress cross-web. This embossing will also provide for cross-web air egress, and the emboss length and frequency are similar to the laser ablation method previously described. The filaments are embossed in one embodiment before they are pressed into the liner. In another embodiment, the full filaments are pressed into the liner, then the filaments and the liner are embossed. In either case, the result is cross-web patterns in the filaments, where the height of the filaments has been effectively reduced by pressing the filament portions.

Figure 8A:
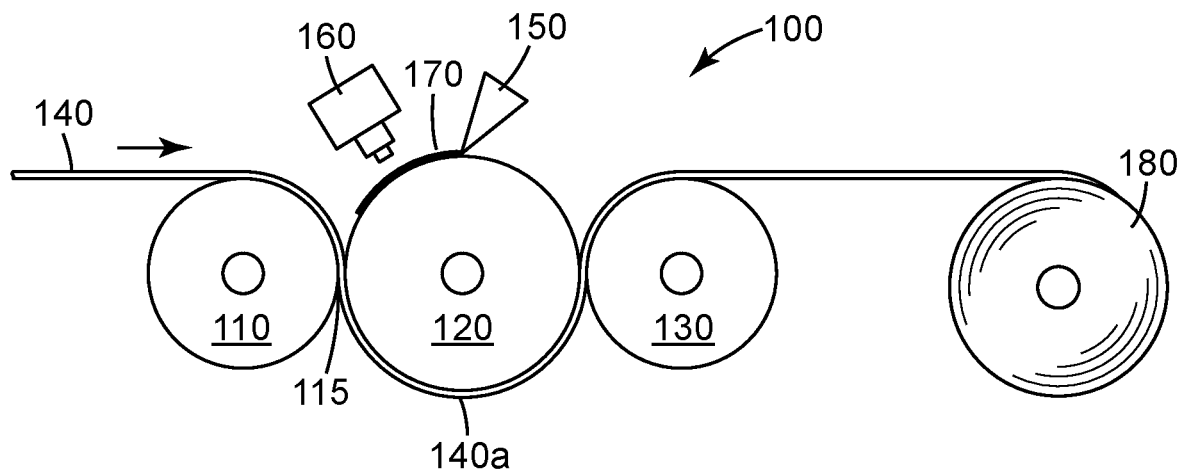
FIG. 8A is a drawing of a manufacturing process for a web having partially embedded filaments.
Figure 8B:
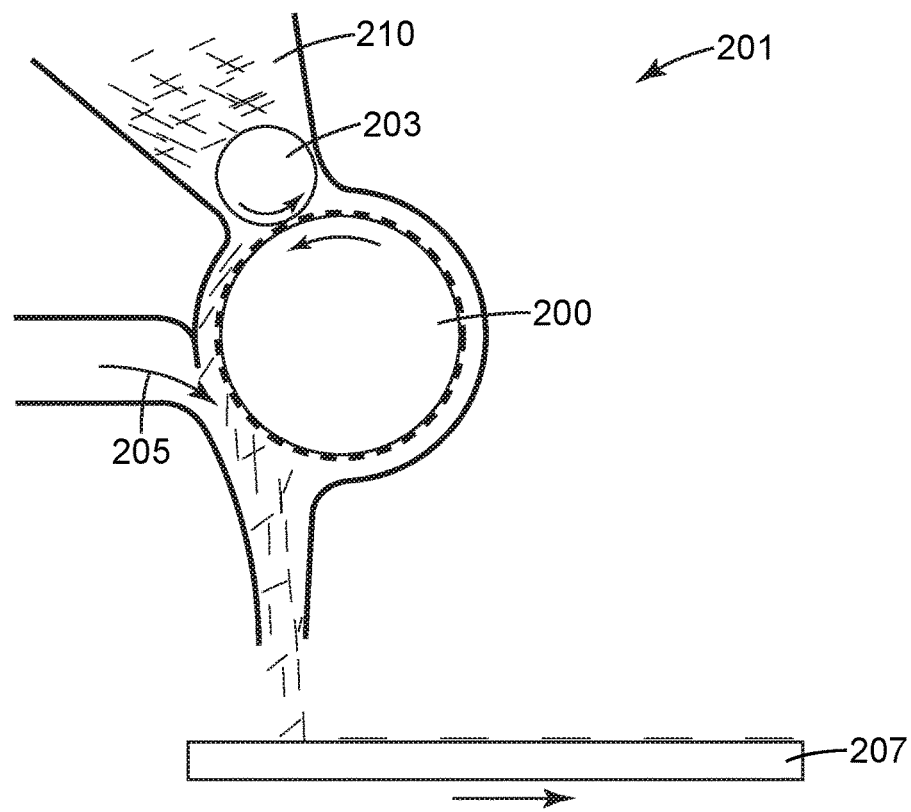
FIG. 8B is a drawing of a manufacturing process for a web having partially embedded filaments.
Figure 9:
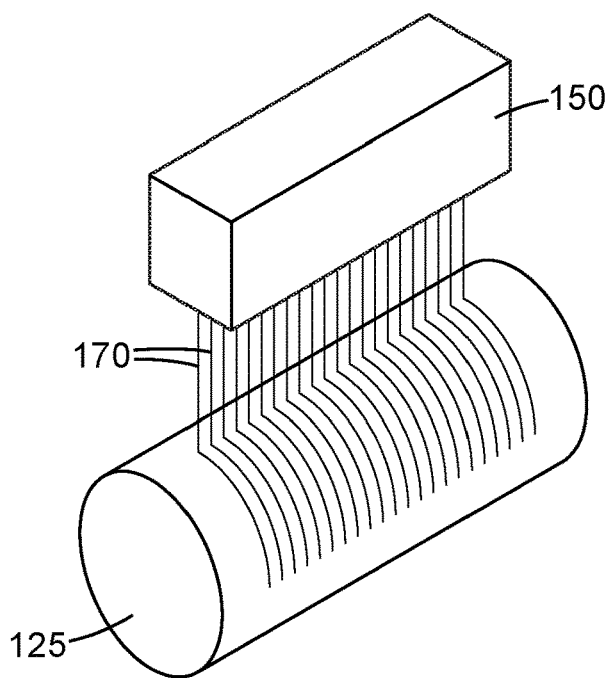
FIG. 9 is a drawing of a machine that can draw filaments to an appropriate average cross-section dimension.

FIG. 8A is a schematic of a manufacturing process for a liner having filaments pressed therein, which may then be contacted with (e.g., coated) with an adhesive layer and printed films, as described above. The process shown in FIG. 8 is a roll-to-roll process, with film conveyed left to right. Other manufacturing processes are also possible, as will be evident to one skilled in the art having read this disclosure. A plurality of filaments 170 are extruded from extruder 150, onto chill roll 120. If the filaments as extruded are not at optimal diameter, as an intermediate step they may be pulled to proper diameter on a roll before they are disposed onto the liner, as is shown in FIG. 9, which shows the extruder 150 extruding filaments 170 onto chilled roll 125 that is turning faster than the rate of extrusion, as part of a melt-drawn process, thereby stretching the filaments. Roll 110 and roll 120 (which is optionally a chilled roll), bring liner 140 and filaments 170 together at nip 115, thereby pressing the filaments into the surface of liner 140 and creating filament containing liner 140a. Roll 130 then orients filament-containing liner 140a for further processing, as needed. For example, such further processing might include coating the filament containing liner 140 with an adhesive layer and a film, such as adhesive layer 20 and film 30 (shown in, e.g., FIG. 6). In such an embodiment, the non-adhesive interfacing major surface of film 30 might be ready to be shipped to a print shop to be used as stock for printing graphics. As shown in FIG. 8, however, the filament-containing liner 140a is rolled on roller 180. Once rolled, filament-containing liner 140a may be stored for further processing later.

The embodiment shown in FIG. 8a also includes laser 160, which may be used to ablate portions of filaments 170 before they are pressed into liner 140 (see FIG. 1B). Such ablations may be cross-web, facilitating cross-web fluid egress. The laser may be an infra-red laser, near infrared laser, or ultraviolet laser. It may be pulsed or continuous. It will generally be delivered into a scanner having mirrors that will deliver the laser to the roll onto which the filaments are being disposed. The scanner's mirrors will direct the laser from one edge of the web to the other. If the web is too wide, multiple scanners may be used with one laser or multiple lasers to accomplish this task.

In another manufacturing embodiment, filament sections of appropriate average size (e.g., 5-50 mm) are blown onto a heated liner before being pressed thereinto. FIG. 8B shows blown filament apparatus 201. Hopper 210 is loaded with fibers of appropriate dimension. Feed roll 203 pulls fibers from the hopper and into teeth of lickerin roll 200. Forced air 205, preferably heated, dislodges the fibers from lickerin roll 200 and deposits the filament pieces onto a major surface of a liner 207, which may be heated to the point of being slightly tacky. At the bottom of the hopper, there could be a knurled or otherwise textured roll (not shown in FIG. 8B) that would rotate, and if necessary, further open the filaments preferably individualizing them. The filaments may then be pressed into the major surface of the liner with a nip (not shown in FIG. 8B). Increasing the distance the blown filaments travel before encountering the web, or increasing the air flow can decrease the dimensionality associated with the deposited filament piece (effectively increasing the "randomness" of the filaments as deposited on the liner). In a further alternative embodiment of such a filament blowing system, two fiber blowing systems may be used: one at 45° to the downweb direction and one at 45° to the cross-web direction, such that the resulting set of filaments tend toward orthogonal orientation on the liner surface (and thus effecting air or fluid egress in two in a finished article). FIG. 1C shows a resulting release liner—release liner with partially embedded filaments 10C comprises release liner 12C with filament pieces disposed thereon. The filament pieces comprise two different sets based on their orientation. A first set is disposed such that they are generally oriented with direction A; the second set is disposed such that they are generally oriented with direction B. Direction A and B differ by 90° (other differences are possible and contemplated within this disclosure). In FIG. 1C', a zoom in on a portion of the liner shown in FIG. 1C, individual filament pieces 4A may be seen disposed approximately orthogonal to filament pieces 4B.

In yet another manufacturing embodiment, filaments can be introduced directly to the adhesive layer of an adhesive-backed film. Such a manufacturing process would like similar to that shown in in relation to FIG. 8B, except liner 207 would be an adhesive coated film, adhesive side up. After coating a film with an adhesive layer using known methods, filament pieces are disposed directly onto the adhesive coating, with forced air 205 being cooled as necessary to develop the proper rheology of the adhesive layer, thus preventing the filaments from sinking too far into the adhesive layer. The filaments are thus tacked slightly to the adhesive surface. The filaments may settle on the adhesive layer in a general alignment consistent with the direction of the air flow; multiple filament deposit stations oriented at two (or more) angles to the web could effect cross-over of the filaments and ultimately cross and down-web air and fluid egress, as discussed in relation to the above manufacturing embodiment. For example a first station could be oriented to position filaments at an angle 45° from down-web, and a second station could be oriented to position filaments at an angle −45° from down web.

Once the filaments are on the adhesive layer, the next step is to apply a release liner to the adhesive layer (which now contains filament pieces) in such a way as to let the filaments, in general, remain extending outward from the surface of the adhesive layer, as discussed earlier in this disclosure. Thus, in one setup, the adhesive-coated film and the filaments are chilled, and a release liner is heated to a softening point, then both are fed into a nip. The liner could be further heated as it wraps around the nip roll. This heating softens the liner release layer, and in the nip, the cool adhesive surface with filaments is contacted to the hot softened liner surface, causing the filaments to at least partially embed into the liner release layer, the remainder being partially embedded in the adhesive layer. When the release liner is removed in the field, the portions of the filaments extending into the release liner would stand proud of the adhesive layer providing benefits and functionality of the embodiments described earlier.

Usefulness of the Invention

Image graphic films are unexpectedly improved by the filament containing adhesive surfaces of the present invention. Image graphic films having filament-containing adhesive surfaces of the present invention can be used to provide fluid egress for a predetermined period of time according to the rheology of the adhesives (creep compliance, modulus, etc.). They also may effect good tack control properties.

One skilled in the art can control fluid egress but minimize fluid ingress at the adhesive interface by (a) selecting a suitable adhesive and (b) forming an appropriate topography by controlling the diameter and hardness of the filaments, and how much they are pressed into the liner, according to the present invention, and (c) appropriately applying the adhesive to the supporting substrate. This provides air egress during installation but afterwards seals the interface between the adhesive and the supporting substrate.

Alternatively, the skilled artisan may select an adhesive with different rheological properties to maintain the topography of the adhesive surface for a longer period of time after initial installation, to permit multiple reinstallations onto the same or different supporting substrate or to maximize available routes for fluid egress.

Adhesive surfaces of the present invention improve economic value by reducing manufacturing costs associated with structuring adhesives with channels, etc., by way of embossing a liner.

Further features, advantages, and embodiments are described in the examples.

EXAMPLES

Webs with partially embedded filaments were prepared. The resultant articles provided good tack control (facilitating repositionability) and air release, as shown in the following examples. These examples are for illustrative purposes only and are not meant to limiting the scope of this disclosure.

Materials:

Abbreviation: Description

R1: Polypropylene resin pellets available from Total Petrochemicals & Refining USA, Inc., Houston, Tex. as 3860.

L1: Release liner available from Loparex LLC, Cary, N.C. as C2S4212A/4000D L/H PC SKC CL PET.

F1: Reflective Graphic Film available from 3M Company, St. Paul, Minn. as 3M SCOTCHLITE Reflective Graphic Film IJ5100.

ADH 1: Hot melt adhesive available from FPC, Wauconda, Ill. as SUREBONDER 725R4-1-GP glue sticks.

T1: Double Sided Tape available from 3M Company, St. Paul, Minn., as SCOTCH Double Sided Tape 665 ½ in.

F2: Transfer adhesive available from 3M Company, St. Paul, Minn., as 9415 High/Low Tack Double Coated Tape Example 1: Liner with Partially Embedded Filaments Liner L1 with release surface facing up was fed through a heated nip consisting of a rubber roll (Roll 1) on top and a steel roll (Roll 2) on the bottom at 60 feet/minute. The nip pressure was 40 lb./in. The nip heat exchanger for both rolls was set to set to 240° F. (116° C.), and the exiting liner was estimated to be 206° F. with an infrared thermometer. Resin R1 was heated and extruded at 480° F. (249° C.) in an extruder with a screw diameter of 50 mm and L/D of approximately 32:1 through a 2-in die with 60 orifices per in onto a room temperature steel roll (Roll 3). The drilled die orifices had openings of 0.008 in (0.20 mm). The extrusion rates were measured at an average of 0.14 lb/hr, but varied due to running low extruder rates.

The resulting extruded filaments were drawn over 5 in. and touched the side of the smooth steel roll (Roll 3) before being nipped with the heated liner on the heated roll (Roll 2), thus pressing the extruded filaments into the up-facing side of the liner. A significant number of filaments "twinned" or merged together near the die tip, and there was at times non-uniform rates of filament extrusion due to the aforementioned variable rate and some variable accumulation on the die tip.

The filaments were then nipped setting the gap to 2 mil with the heated liner between Rolls 2 and 3, thus embedding the filaments into the liner surface. The majority of the filaments were 28-30 μm in height, but due to filaments combining or "twinning" and the aforementioned variable rates, the filament width ranged between 17 and 155 μm. This produced a liner with embedded filaments.

Example 2: Film Laminated to Liner with Embedded Filaments

A section of liner with embedded filaments, a la Example 1, was placed on a hard, flat bench surface with the embedded filaments facing up. A slightly larger section of reflective graphic film F1 was then laminated to the liner: First, a small section of film F1 was aligned with the filament containing liner and manually tacked to the bench. Then, a rubber roller (similar to p/n EDI: 19560, available from Marshalltown Company, Marshalltown, Iowa) was placed on the tacked portion of the film F1 and advanced, thus laminating the film F1 to the Liner with Embedded Filaments.

Example 3: Repositionable Adhesive Film with Filaments

The laminate of Example 2 was separated manually removing the liner L1 used Example 1 from the film F1. As the two films separated, the filaments remained on the adhesive side of the film F1. This formed an adhesive backed film with partially embedded filaments.

The adhesive backed film with partially embedded filaments was placed adhesive side down onto a surface, without additional pressure—that is, there was no aggressive pressing, such that the filaments prevented the adhesive layer from making intimate contact with the surface. The adhesive backed film with partially embedded filaments was then moved and repositioned by pulling a corner of the film. Once the film was pressed gently, it adhered to the surface. When pressed more firmly more adhesive bonded to the surface, increasing the bond.

Another sample (this one a 1.5 inch wide strip) of adhesive backed film with partially embedded filaments was adhered to a glass surface by pressing and advancing a hand-held roller (similar to p/n EDI: 19560, available from Marshalltown Company, Marshalltown, Iowa) across its surface while applying approximately 100N downward force. This action smoothed out the top surface, adhered the adhesive to the glass surface (approximately 97% adhesive contact was observed from the back side of the glass), and removed most of the remaining air, thus creating a good bond.

Example 4: Adhesive Backed Film with Partially Embedded Hot Melt Adhesive Filaments A filament alignment tool was constructed for pressing filaments into a liner. It comprised a flat rectangular plate with an array of pegs along two opposite sides (0.039 in (1 mm) pegs with 0.079 in (2 mm) center-to-center pitch).

An adhesive-backed reflective graphic film F1 sample approximately 4 in×4 in was placed in the center of the alignment tool with liner removed, adhesive side facing up. A black poster board surface was set on a bench. A glue stick of ADH1 was placed in a 3M POLYGUN AE II (3M Company, St. Paul, Minn.) and heated according to directions. Hot melt adhesive filaments were manually created using the following procedure: 1) Generally less than 0.01 g of adhesive was extruded onto the poster board; 2) The gun was lifted approximately 0.13 in (3 mm) off the poster board creating a filament; 3) The gun was quickly accelerated parallel to the poster board surface and moved at a velocity greater than 10 ft/s (3.0 m/s), drawing the filament, and 4) The hot melt adhesive was tacked to the poster board.

Hot melt adhesive filaments less than 100 microns in average cross section were selected, manually transported to the alignment tool, aligned against a side of the corresponding pegs in each peg strip, and pressed onto the adhesive surface of the graphic film at approximately 1 MM intervals. Overhanging portions of the filaments were severed with a razor.

An approximately 1.5 in wide strip of this sample was applied to a glass surface by pressing and advancing a hand-held roller (similar to p/n EDI: 19560, available from Marshalltown Company, Marshalltown, Iowa) across its surface while applying approximately 10N downward force, providing light tack. A heat gun (Master Heat Gun, model #HG-301A available from Master Appliance Corporation, Racine, Wis.) was used to raise the film (and filament) temperature to greater than 150° F. The hand-held roller was advanced across the surface applying approximately 100N downward force. This action smoothed out the top surface, molded the hot melt adhesive filaments to the glass surface, and removed most of any trapped air. Upon microscopic analysis, it was evident that there was little or no air between the filaments and that the filaments had deformed and adhered to the glass surface. The back side of the glass surface was observed, and it appeared that nearly 100% of the glass surface was in contact with the adhesive layer (before the heating and application, it was approximately 66%).

Example 5: Adhesive Backed Film with Partially Embedded Filaments Having Cross Web Variation An approximately 4 in.×2 in. sample of reflective graphic film F1 with the adhesive side up, was placed on the filament alignment tool described above. Filaments similar to those in Example 1 were placed on the adhesive surface of reflective graphic film F1. Filaments were deviated from a linear, parallel path by guiding the filament path using a sharp tweezer tip, creating an arc in the filament path.

Example 6: Tack Controlled Adhesive Backed Film with Partially Embedded Filaments Having Down-Web Variability and Additional Filaments Arranged Perpendicular to the Down-Web Filaments Filaments prepared similarly to those in Example 1 were placed atop an adhesive backed film similar to Example 5. Additional filaments were added to this array, generally perpendicular to the primary filament array. A curve was placed in additional filaments using the method of Example 5, thus creating a curve in the filaments with an approximately 0.13 in (3.3 mm) deviation from a straight line. The filaments perpendicular to the primary filament array were spaced approximately 0.4 in (10 mm) apart. The final array was approximately 4 in.×4 in. This produced an adhesive backed film with filaments having varying down-web direction and additional filaments arranged perpendicular to the down-web filaments.

An approximately 1 in.×3 in. strip was cut from this film of Example 6. The film was laid on a glass slide surface, adhesive side down. An approximately 0.25 in. (13 mm) section on the left side was pressed against the glass, creating a strong bond. The strip was adhered to a glass slide by pressing and advancing a hand-held roller (similar to p/n EDI: 19560, available from Marshalltown Company, Marshalltown, Iowa) across its surface from the right side while applying approximately 100N downward force. Trapped air was easily egressed in both cross-web and down-web directions.

Example 7: Adhesive Backed Film with Partially Embedded and Embossed Filaments An approximately 4 in.×4 in. sheet of transfer adhesive F2 was adhered between the peg strips in the filament alignment tool described in Example 4. Filaments similar to those produced in Example 1 were placed in the filament alignment tool as in Example 4 above the wires. The filaments were cut with a razor just outside the transfer adhesive F2 in lines parallel to the peg strips.

31 gauge (0.009 in or 0.23 mm diameter) copper wires were laid orthogonal to the direction of the filaments, a 0.4 in (10 mm) spacing, on the adhesive side of a sheet of transfer adhesive F2. Filaments similar to those produced in Example 2 were laid atop the copper wires. An 8 in×5 in flat metal plate was placed atop the construction and pressed into the filaments and transfer tape with approximately 2 tons of force for 1 minute at room temperature. The copper wires thus embossed the filaments. The plate was removed and a sheet of reflective graphic film F1 was placed above the now embossed filaments, adhesive side contacting the filaments. The sheet was gently rolled with a hand roller so the adhesive backed side of the film F1 could grab the embossed filaments. The graphic film, including the embossed filaments, was removed from the transfer adhesive F2 and the wires. This formed the adhesive backed film with partially embedded and embossed filaments.

An approximately 2 in.×3 in. strip was cut from this film. The material was laid on a glass surface. An approximately 0.25 in (13 mm) section on the left side was pressed against the glass, creating a strong bond. The strip was adhered to a glass slide by pressing and advancing a hand-held roller (similar to p/n EDI: 19560, available from Marshalltown Company, Marshalltown, Iowa) across its surface from the right side while applying approximately 100N downward force. The air was easily removed in both the down web and cross web direction.

Example 8: Adhesive Backed Film with Partially Embedded Filaments Having Cross-Web Ablations Filaments created similarly to those in Example 1 were arranged in the filament alignment tool as in Example 4, creating a 1 inch (26 fiber) array. The filaments were positioned using double-sided adhesive tape T1 and a positioning plate. Then, a 400W Diamond E laser (Diamond E-400 available from Coherent, Santa Clara, Calif.) was set to 10 khz, 8% power and scanned perpendicular to the filament direction at 0.5 m/s while being focused on the filaments. This action ablated a portion of the filaments, creating an approximately 0.4 mm gap in the filaments where the laser was scanned. Some material also melted and was pooled at the filament near the ends of the gap. The adhesive side of a graphic film could then be pressed into the filaments to pick them up, and thus facilitate air egress in both the cross web and down web directions, and tack control.

The invention is not limited to the above embodiments, and at least the following embodiments are described:

Embodiment 1. A method of making a film-based article having a plurality of filaments, comprising: pressing the plurality of filaments into a first major surface of a release liner to produce a filament-containing release liner; and, laminating an adhesive side of an adhesive-backed film to the first major surface of the filament-containing release liner.

Embodiment 2. The method of embodiment 1, further comprising: before the pressing step, heating the release liner.

Embodiment 3. The method of any of the previous embodiments, wherein the first major surface of the release liner comprises a release agent.

Embodiment 4. The method of embodiment 3, wherein the release agent is silicone-based.

Embodiment 5. The method of embodiment any of the previous embodiments, further comprising: extruding the filaments.

Embodiment 6. The method of embodiment any of the previous embodiments, further comprising: drawing the filaments.

Embodiment 7. The method of embodiment 6, wherein the filaments are drawn until their average cross-section dimension is between about 5 µm and 50 µm.

Embodiment 8. The method of any of the previous embodiments, wherein the total area of the first major surface of the release liner is "T", and wherein the total area of the filaments is "A", and wherein the ratio of T to A to between 5 and 50%.

Embodiment 9. The method of embodiment 8, wherein the ratio of T to A is between 5-15%.

Embodiment 10. The method of any of the previous embodiments, wherein the filaments comprise thermoplastic extrusions.

Embodiment 11. The method of any of the previous embodiments, wherein the filaments comprise long, thin thermoplastic extrusions.

Embodiment 12. The method of any of the previous embodiments, wherein the filaments comprise hot-melt adhesive.

Embodiment 13. The method of any of the previous embodiments, wherein the filaments are oriented in a down-web direction.

Embodiment 14. The method of any of the previous embodiments, further comprising: contacting filament pieces to the first major surface of the release liner.

Embodiment 15. The method of any of the previous embodiments, further comprising: blowing filament pieces onto the first major surface of the release liner.

Embodiment 16. The method of any of the previous embodiments, further comprising: contacting a first set of partially oriented filament pieces onto the first major surface of the release liner, the filaments partially oriented according to a first direction; and, contacting a second set of partially oriented filament pieces onto the first major surface of the release liner, the filaments partially oriented according to a second direction.

Embodiment 17. The method of embodiment 16, wherein the first direction and the second direction are orthogonal to one another.

Embodiment 18. The method of embodiment 16, wherein filaments of the first and second sets of partially oriented filaments overlap one another.

Embodiment 19. The method of any of the previous embodiments, further comprising: ablating portions of the pressed filaments.

Embodiment 20. The method of embodiments 1-15, further comprising: embossing portions of the pressed filaments.

Embodiment 21. The method of any of the previous embodiments, further comprising: embossing a pattern into the filament-containing release liner.

Embodiment 22. A method of making a film-based article having a plurality of filament pieces, comprising: contacting the plurality of filament pieces to an adhesive side of an adhesive-coated film to produce a filament-containing adhesive-coated film; and, laminating a release liner to the adhesive side of the filament-containing adhesive-coated film.

Embodiment 23. The method of embodiment 22, further comprising: cooling the adhesive side of the adhesive-coated film before contacting the plurality of filaments.

Embodiment 24. The method of embodiment 22 or 23, further comprising: heating the release liner before the lamination step.

Embodiment 25. The method of embodiment 22-24, wherein the lamination step partially presses the filament pieces into the adhesive layer.

Embodiment 26. The method of embodiment 22-25, wherein the heated release liner is heated to a softening point, and the lamination step allows the filaments to be depressed into the surface of the heated release liner.

The invention claimed is:

1. A method of making a film-based article having a plurality of filaments, comprising:
    pressing the plurality of filaments into a first major surface of a release liner to produce a filament-containing release liner such that the release liner deforms to accommodate the pressed filaments;
    laminating an adhesive side of an adhesive-backed film to the first major surface of the filament-containing release liner.

2. The method of claim 1, further comprising:
    before the pressing step, heating the release liner.

3. The method of claim 1, wherein the first major surface of the release liner comprises a release agent.

4. The method of claim 2, further comprising:
    extruding the filaments.

5. The method of claim 4, further comprising:
    drawing the filaments.

6. The method of claim 5, wherein the filaments are drawn until their average cross-section dimension is between about 5 μm and 50 μm.

7. The method of claim 6, wherein the total area of the first major surface of the release liner is "T", and wherein the total area of the filaments is "A", and wherein the ratio of T to A to between 5 and 50%.

8. The method of claim 1, wherein the filaments comprise thermoplastic extrusions.

9. The method of claim 1, wherein the filaments comprise hot-melt adhesive.

10. The method of claim 6, wherein the filaments are oriented in a down-web direction.

11. The method of claim 1, further comprising:
    contacting filament pieces to the first major surface of the release liner.

12. The method of claim 1, further comprising:
    blowing filament pieces onto the first major surface of the release liner.

13. The method of claim 1, further comprising:
    contacting a first set of partially oriented filament pieces onto the first major surface of the release liner, the filaments partially oriented according to a first direction;
    contacting a second set of partially oriented filament pieces onto the first major surface of the release liner, the filaments partially oriented according to a second direction.

14. The method of claim 13, wherein the first direction and the second direction are orthogonal to one another.

15. The method of claim 1, further comprising:
    ablating portions of the pressed filaments.

16. The method of claim 1, further comprising:
    embossing portions of the pressed filaments.

17. The method of claim 1, further comprising:
    embossing a pattern into the filament-containing release liner.

* * * * *